United States Patent
White et al.

(10) Patent No.: US 9,406,059 B1
(45) Date of Patent: Aug. 2, 2016

(54) CHECKOUT IMAGING MECHANISM

(71) Applicant: NCR Corporation, Duluth, GA (US)

(72) Inventors: Daniel Frederick White, Gainesville, GA (US); Lakambini Abalde Chavez-Laurico, Lapulapu (PH); Joseph Jover Piñon Mendoza, Mandaue (PH); Anthony Pages Regis, Cebu (PH)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/667,871

(22) Filed: Mar. 25, 2015

(51) Int. Cl.
  *G06K 15/00* (2006.01)
  *G06Q 20/20* (2012.01)
  *G07G 1/00* (2006.01)
  *G07G 5/00* (2006.01)
  *G06F 17/30* (2006.01)

(52) U.S. Cl.
  CPC ........ *G06Q 20/208* (2013.01); *G06F 17/30831* (2013.01); *G06Q 20/209* (2013.01); *G07G 1/0054* (2013.01); *G07G 5/00* (2013.01)

(58) Field of Classification Search
  CPC ............. G06K 2017/0064; G06K 2017/0067; G06Q 10/087; G06Q 20/209; G06Q 20/3276; G06Q 30/02; G06Q 20/208; G07G 1/0054; G07G 5/00; G06F 17/30831
  USPC ....................................................... 235/383
  See application file for complete search history.

(56) References Cited

U.S. PATENT DOCUMENTS

| | | | | |
|---|---|---|---|---|
| 2006/0043193 A1* | 3/2006 | Brock | ................ | G06K 7/10881 235/462.41 |
| 2009/0006151 A1* | 1/2009 | Zarghami | ......... | G06Q 10/06375 705/7.31 |
| 2009/0272801 A1* | 11/2009 | Connell, II | ......... | G06K 7/10792 235/383 |
| 2010/0059589 A1* | 3/2010 | Goncalves | ......... | G06K 9/00771 235/383 |
| 2010/0076855 A1* | 3/2010 | Karnin | ..................... | A47F 9/047 705/24 |
| 2010/0158310 A1* | 6/2010 | McQueen | ................ | G06K 9/00 382/100 |
| 2012/0127314 A1* | 5/2012 | Clements | ............. | G08B 13/246 348/150 |
| 2012/0166298 A1* | 6/2012 | Smith | ................... | G06Q 20/209 705/24 |
| 2014/0040053 A1* | 2/2014 | Argue | ................ | G06Q 20/0453 705/17 |
| 2014/0088951 A1* | 3/2014 | Argue | ..................... | G06Q 30/04 704/2 |
| 2015/0134458 A1* | 5/2015 | Pellegrini | ............... | G06Q 30/02 705/14.64 |
| 2015/0149312 A1* | 5/2015 | Cancro | ................ | G06Q 20/209 705/24 |
| 2015/0254942 A1* | 9/2015 | Agarawal | ......... | G06K 19/06112 235/383 |

\* cited by examiner

*Primary Examiner* — Thien M Le
*Assistant Examiner* — Claude J Brown
(74) *Attorney, Agent, or Firm* — Schwegman, Lundberg & Woessner

(57) ABSTRACT

A checkout system includes a scanner, a camera positioned to capture images of items being scanned by the scanner, and a receipt generator coupled to receive information of items being scanned and images of the items being scanned, correlate the information and images, and provide a link to the images on a receipt.

20 Claims, 3 Drawing Sheets

CHECKOUT IMAGING MECHANISM

BACKGROUND

When customers are done with shopping in a store, they may review and check items that were purchased to ensure they were charged correct amounts. A printed receipt may be used to facilitate such review, but may not be revealing of actual events that occurred or did not occur during checkout.

SUMMARY

A checkout system includes a scanner, a camera positioned to capture images of items being scanned by the scanner, and a receipt generator coupled to receive information of items being scanned and images of the items being scanned, correlate the information and images, and provide a link to the images on a receipt.

A method includes scanning an item at a checkout counter, imaging the scanning of the item at the checkout counter, and creating a receipt that includes a link associated with the item, the link providing access to the imaging of the item.

A checkout system includes a scanner, a camera supported to provide imaging of items being scanned by the scanner, circuitry coupled to receive signals from the scanner representative of the items being scanned and to receive imaging from the camera of the items being scanned, and a memory device coupled to the circuitry and having a program stored thereon for execution by the circuitry to create a receipt that includes a link associated with the items being scanned, the link providing access to the imaging of the items.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
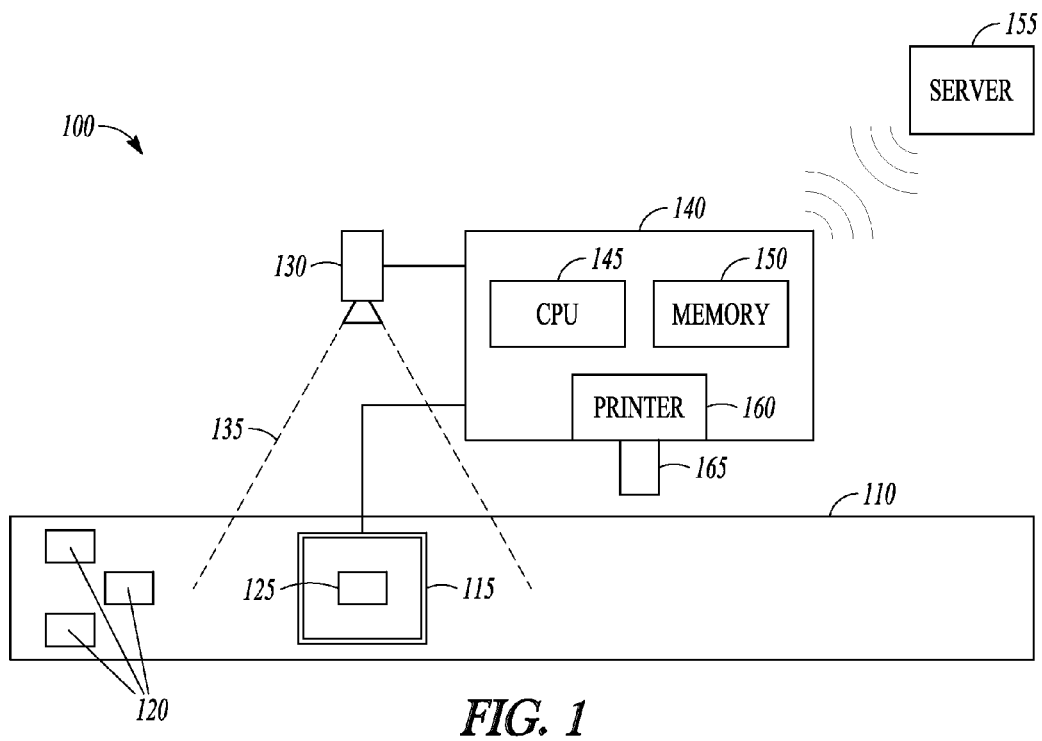
FIG. 1 is a block diagram illustrating a checkout system for imaging checkout transactions and making the imaging available to customers according to an example embodiment.

FIG. 1 is a block diagram illustrating a checkout system 100 for imaging checkout transactions and making the imaging available to customers according to an example embodiment. Checkout system 100 in one embodiment comprises a counter 110 having a scanner 115 to scan multiple items 120 being purchased. One item 125 is shown being swiped across the scanner 115. A camera 130 having a field of view represented at 135 is imaging the swiping of item 125 across the scanner 115. The imaging may include one or more still images of each item being scanned, a video segment of each item being scanned, or simply periodic images of an entire group of items being purchased in a transaction.

In various embodiments, the camera may continuously capture images and provide them to circuitry indicated at 140. Circuitry 140 may then select the images based on receipt of scanning information for each product from scanner 125, providing an image, video segment, or sequence of images spanning from just prior to just after receipt of the scanning information, or may simply note the beginning and end of a transaction involving one or more items being checked out, and capture images during that entire time period. Capturing imaging during the entire time period may be useful in detecting items that were not properly scanned, or scanned twice, and provides more information relevant to checking that the checkout process occurred correctly.

Circuitry 140 may include a processor or CPU 145 and memory 150 having programming for interfacing with the camera 130, scanner 115, and a remote server 155. The circuitry 140 may obtain further information about the item scanned from the server, such as price, rebate information and other information. Server 155 may include applications to run business processes and store information about transactions, including in some embodiments, inventory and accounting functions.

In one embodiment, circuitry 140 may include a printer 160 for printing receipts 165. The receipts 165 may be printed on paper, or may be generated as an electronic receipt, such a PDF file or other image viewable on a user device.

System 100 may be a Point-Of-Sale (POS) installation or may also be any Self-Service Terminal (SST), kiosk, vending machine, check-in and/or check-out terminal, such as those used in retail, hotel, car rental, healthcare, or financial industries, etc., can benefit from the teachings presented herein.

The scanner 115 may be an optical scanner that includes an external image light source (optional), one or more windows, image capture sensors, an internal image light source, an image sampler, and an alert manager in various embodiments.

In an embodiment, the optical scanner 115 may be integrated into a Self Service checkout station operated by a customer.

In an embodiment, the optical scanner 115 is integrated into a POS checkout station operated by a cashier.

The scanner 115 may have an optical system that provides a substantially focused image of an object to a two-dimensional (2D) image sensor. It should be appreciated that a scanner 115 may have one or more image sensors and that each of these may be provided with a substantially focused image of one or more objects by one or more optical systems. It should also be appreciated that a scanner 115 may obtain images of the same object from multiple viewing angles.

The 2D image sensor may have a regularly spaced grid of sensor elements such that an optical image that is captured is transformed by the sensor into an array of pixel values, one pixel value corresponding to each sensor element and recording data such as light intensity and color. In this way a 2D image sensor may convert the image provided by the optical system into an array of pixel values that may then be manipulated mathematically.

An object (such as a barcode on a produce being scanned), which is outside the scanner, may be imaged by the scanner 115 by passing light from the object (perhaps by using an external image light source), through an optical window in the outermost portion of the scanner, through the remainder of the optical system inside the scanner 115, to one or more image sensors. Depending on the design of the scanner 115, there may be multiple optical windows passing light from the object to one or more optical systems and then on to one or more image sensors.

Figure 2:
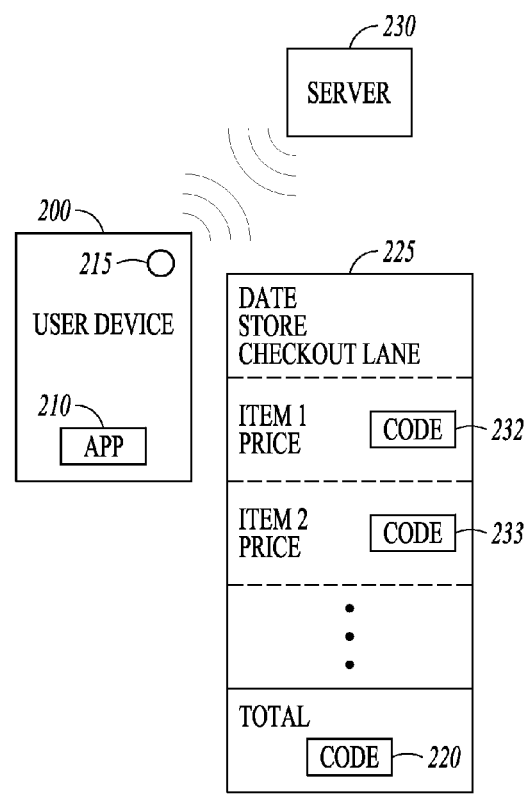
FIG. 2 is a block diagram illustrating devices used to obtain imaging of checkout transactions according to an example embodiment.

FIG. 2 is a block diagram illustrating devices used to obtain imaging of checkout transactions according to an example embodiment. A user device 200 may be a smart phone, tablet, or other networked device. In one embodiment, the device 200 may have an application, referred to as app 210 loaded on it. App 210 as illustrated is representative of a computer program and an icon on a touch screen display of device 200. By running the app 200, a device camera 215 may be utilized to scan a code 220 on a receipt 225 generated by the circuitry 140. The receipt 225 may list each item and include an item description and price, as does a common receipt, and may also include one or more scannable codes. In one embodiment, each code may be a link, such as a hyperlink in an electronic copy of the receipt, or may be a visual code which can be imaged and processed to obtain a hyperlink.

Code 220 in one embodiment comprises bar code, such as a QR code that contains a link to a server 230 containing imaging corresponding to one or more items on the receipt. In one embodiment, each item on the receipt may have a code as indicated at 232 and 233, each providing a link to an imaging segment corresponding to the respective items.

In one embodiment, each link comprises an IP address that uniquely identifies the corresponding imaging and is provided from the server 230 to the device 200 for display. In one embodiment, the server 230 may be the same server as server 155, or may be a different server which may be accessed via network, such as the internet. The device may be Wi-Fi enabled or may utilize other wireless communications protocols to request and receive the imaging. The app 210 may include programming, such as code and/or calls to functions to recognize the codes, interpret the codes, and activate browsing and networking capabilities to render the imaging for viewing on the screen of the device 200.

Figure 3:
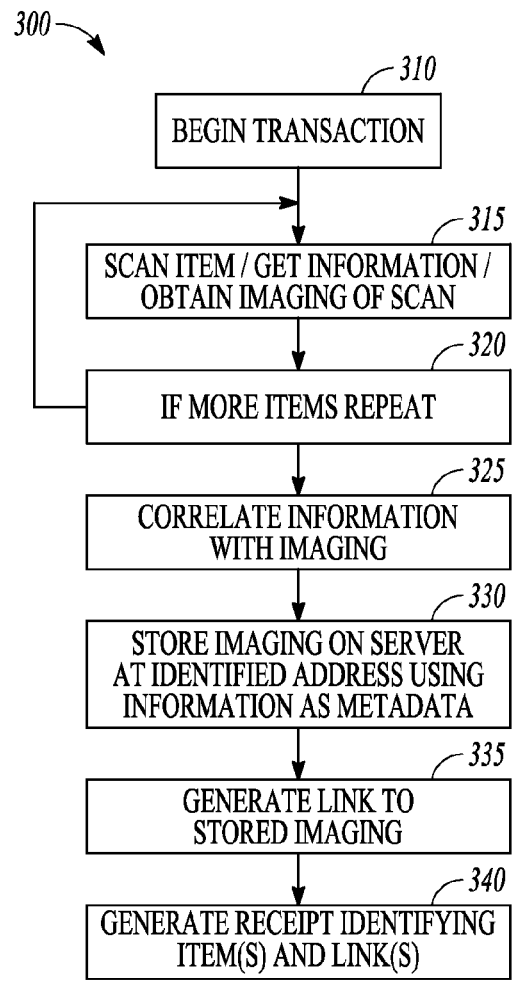
FIG. 3 is a flowchart illustrating a method of imaging checkout transactions according to an example embodiment.

FIG. 3 is a flowchart illustrating a method 300 of imaging checkout transactions according to an example embodiment. Method 300 starts by beginning a transaction at 310. At 315 an item is scanned in a checkout lane, and information concerning the item, such as price is obtained, as is imaging of the item being scanned. At 320, if there are more items to be scanned for the transaction, they are scanned at 315.

At 325, the information is correlated with the imaging. This may be done by using a clock to tag the item with a time of scanning, and to provide metadata with the imaging, such as time of scanning. Information identifying the item may also be included in the imaging metadata.

At 330, the imaging, including the metadata, may be stored on a server at a selected address. At 335, a link to the selected address where the imaging is stored is generated and encoded in a code, such as a hyperlink, or bar code such as a QR code. At 340, a receipt identifying the items and code is generated. The receipt may be an electronic receipt viewable on a user device, or may be printed on paper or other suitable material.

In one embodiment, a link may be generated and encoded into a code for each item scanned. Each item on the receipt may have a corresponding link identifying associated imaging. In one embodiment, the imaging comprises a video of the items being scanned.

Figure 4:
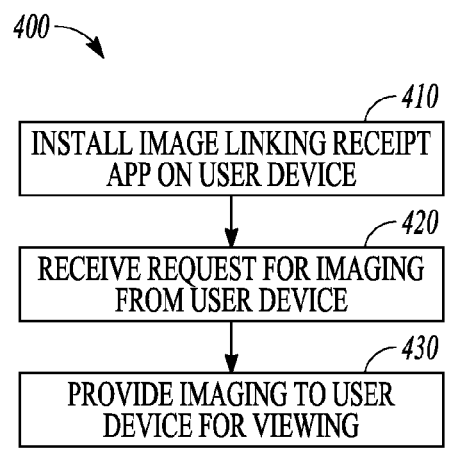
FIG. 4 is a flowchart illustrating a method of providing checkout transaction imaging to a user according to an example embodiment.

FIG. 4 is a flowchart illustrating a method 400 of providing checkout transaction imaging to a user according to an example embodiment. At 410, an image linking receipt application may be installed on a user device. The application may be installed before or after transactions are performed. Using the application at 420, the user may use the receipt to request an image associated with a transaction from the user device.

The device may be used to take a picture of the receipt, which includes a picture of the code, and decode the code to generate an address such as a hyperlink corresponding to imaging of the transaction. The device may alternatively be used to display a view of an electronic receipt, and the user may select a code with a corresponding hyperlink via a touchscreen or other user interface on the user device. At 430, the hyperlink is used to retrieve the imaging via a wireless network and to render the imaging on the user device for viewing.

The imaging may include still images of items being scanned, a sequence of still images of each item being scanned, a video segment of each item being scanned, or a video of the entire transaction in various embodiments. The application may provide a user selection for the type of imaging to be viewed, or may allow scanning or selection of a code for each individual item in the transaction.

Figure 5:
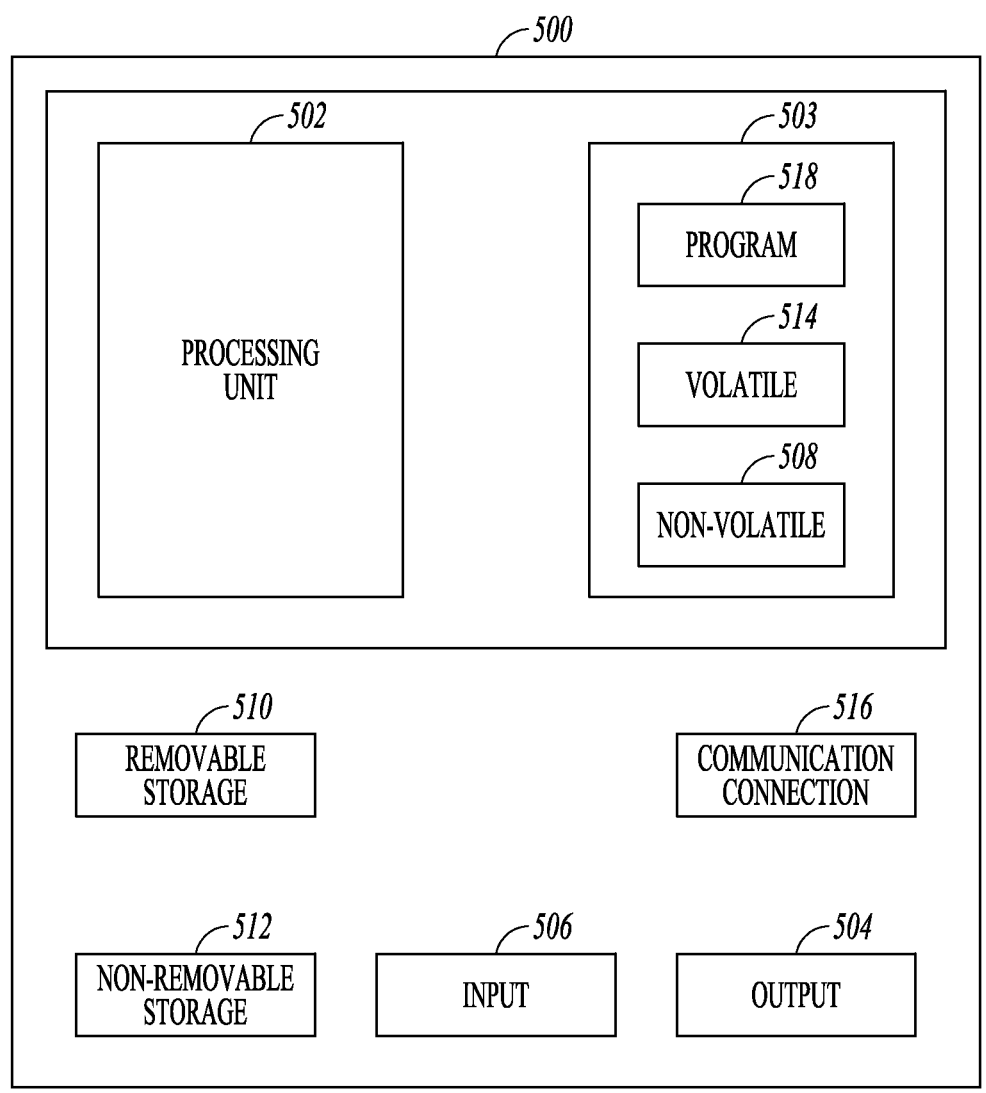
FIG. 5 is a block diagram illustrating example circuitry for use in imaging and providing imaging of checkout transactions according to an example embodiment.

FIG. 5 is a block diagram illustrating example circuitry for use in imaging and providing imaging of checkout transactions according to an example embodiment. In one embodiment, the circuitry comprises a computer system 500 to implement methods according to example embodiments. All components need not be used in various embodiments. One example computing device in the form of a computer 500, may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 500, the storage may also or alternatively include cloud-based storage accessible via a network, such as the Internet.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input 506, output 504, and a communication connection 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 502 of the computer 500. A hard drive, CD-ROM, and RAM are some examples of articles including a non-transitory computer-readable medium such as a storage device. The terms computer-readable medium and storage device do not include carrier waves. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A checkout system comprising:
a scanner;
a camera positioned to capture images of items being scanned by the scanner; and
a receipt generator coupled to receive information of items being scanned and images of the items being scanned, correlate the information and images, and provide a link to the images on a receipt.

2. The system of example 1 wherein the images comprise a video of the items being scanned.

3. The system of any of examples 1-2 wherein the link to the images comprises a bar code.

4. The system of any of examples 1-3 wherein the receipt is a printed receipt.

5. The system of any of examples 1-4 wherein the receipt is an electronic receipt.

6. The system of any of examples 1-5 wherein the link uniquely identifies a video of the images being scanned.

7. The system of example 6 wherein the receipt has a link for each individual item scanned that uniquely identifies a video segment of each item being scanned.

8. The system of any of examples 1-7 wherein the receipt has a link for each individual item scanned that uniquely identifies an image of each item being scanned.

9. The system of any of examples 1-8 wherein the images are stored on a remote server.

10. A method comprising:
scanning an item at a checkout counter;
imaging the scanning of the item at the checkout counter;
creating a receipt that includes a link associated with the item, the link providing access to the imaging of the item.

11. The method of example 10 and further comprising scanning and imaging multiple items, wherein the link provides access to the imaging of the multiple items during a transaction.

12. The method of example 11 and further comprising:
generating a link for each item scanned; and
providing a list of the items scanned on the receipt, each item having an associated link identifying imaging of each item.

13. The method of any of examples 10-12 wherein the imaging comprise a video of the items being scanned.

14. The method of any of examples 10-13 wherein the link to the images comprises a bar code encoding an IP address.

15. The method of any of examples 10-14 wherein the receipt is a printed receipt.

16. A checkout system comprising:
a scanner;
a camera supported to provide imaging of items being scanned by the scanner;
circuitry coupled to receive signals from the scanner representative of the items being scanned and to receive imaging from the camera of the items being scanned; and a memory device coupled to the circuitry and having a program stored thereon for execution by the circuitry to create a receipt that includes a link associated with the items being scanned, the link providing access to the imaging of the items.

17. The system of example 16 wherein the circuitry comprises a printer to print the receipt.

18. The system of any of examples 16-17 wherein the images comprise a video of the items being scanned.

19. The system of any of examples 16-18 wherein the link to the images comprises a bar code.

20. The system of any of examples 16-19 wherein the receipt has a link for each individual item scanned that uniquely identifies a video segment of each item being scanned.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A checkout system comprising:
 a scanner;
 a camera positioned to capture images of items being scanned by the scanner; and
 a receipt generator coupled to receive information of items being scanned and images of the items being scanned, correlate the information and images, and provide a link to the images on a receipt.

2. The system of claim 1 wherein the images comprise a video of the items being scanned.

3. The system of claim 1 wherein the link to the images comprises a bar code.

4. The system of claim 1 wherein the receipt is a printed receipt.

5. The system of claim 1 wherein the receipt is an electronic receipt.

6. The system of claim 1 wherein the link uniquely identifies a video of the images being scanned.

7. The system of claim 6 wherein the receipt has a link for each individual item scanned that uniquely identifies a video segment of each item being scanned.

8. The system of claim 1 wherein the receipt has a link for each individual item scanned that uniquely identifies an image of each item being scanned, and wherein the information and images are correlated as a function of the time of scanning and capturing the images.

9. The system of claim 1 wherein the images are stored on a remote server.

10. A method comprising:
    scanning an item at a checkout counter;
    imaging the scanning of the item at the checkout counter; and
    creating a receipt that includes a link associated with the item, the link providing access to the imaging of the item.

11. The method of claim 10 and further comprising scanning and imaging multiple items, wherein the link provides access to the imaging of the multiple items during a transaction.

12. The method of claim 11 and further comprising:
    generating a link for each item scanned; and
    providing a list of the items scanned on the receipt, each item having an associated link identifying imaging of each item.

13. The method of claim 10 wherein the imaging comprises a video of the items being scanned.

14. The method of claim 10 wherein the link to the images comprises a bar code encoding an IP address.

15. The method of claim 10 wherein the receipt is a printed receipt.

16. A checkout system comprising:
    a scanner;
    a camera supported to provide imaging of items being scanned by the scanner;
    circuitry coupled to receive signals from the scanner representative of the items being scanned and to receive imaging from the camera of the items being scanned; and
    a memory device coupled to the circuitry and having a program stored thereon for execution by the circuitry to create a receipt that includes a link associated with the items being scanned, the link providing access to the imaging of the items.

17. The system of claim 16 wherein the circuitry comprises a printer to print the receipt.

18. The system of claim 16 wherein the images comprise a video of the items being scanned.

19. The system of claim 16 wherein the link to the images comprises a bar code.

20. The system of claim 16 wherein the receipt has a link for each individual item scanned that uniquely identifies a video segment of each item being scanned.

\* \* \* \* \*